(12) United States Patent
Halpern et al.

(10) Patent No.: US 7,406,692 B2
(45) Date of Patent: Jul. 29, 2008

(54) SYSTEM AND METHOD FOR SERVER LOAD BALANCING AND SERVER AFFINITY

(75) Inventors: Eric M. Halpern, San Francisco, CA (US); Prasad Peddada, Albany, CA (US); Naresh Revanuru, Fremont, CA (US)

(73) Assignee: BEA Systems, Inc., San Jose, CA (US)

( * ) Notice: Subject to any disclaimer, the term of this patent is extended or adjusted under 35 U.S.C. 154(b) by 771 days.

(21) Appl. No.: 10/785,778

(22) Filed: Feb. 24, 2004

(65) Prior Publication Data

US 2004/0250248 A1    Dec. 9, 2004

Related U.S. Application Data

(60) Provisional application No. 60/449,775, filed on Feb. 24, 2003.

(51) Int. Cl.
*G06F 9/46* (2006.01)
*G06F 15/16* (2006.01)

(52) U.S. Cl. .............. 718/105; 719/313; 719/330; 709/201; 709/203; 709/227; 709/245

(58) Field of Classification Search ......... 718/100–105; 709/201–203, 238, 227, 245; 719/313, 330
See application file for complete search history.

(56) References Cited

U.S. PATENT DOCUMENTS

| 6,125,363 | A | 9/2000 | Buzzeo et al. | |
|---|---|---|---|---|
| 6,327,622 | B1 | 12/2001 | Jindal et al. | |
| 6,385,643 | B1 * | 5/2002 | Jacobs et al. | 709/203 |
| 6,424,992 | B2 * | 7/2002 | Devarakonda et al. | 709/203 |
| 6,581,088 | B1 * | 6/2003 | Jacobs et al. | 718/105 |
| 6,691,165 | B1 | 2/2004 | Bruck et al. | |
| 6,928,457 | B2 * | 8/2005 | Jacobs et al. | 707/201 |
| 6,950,848 | B1 * | 9/2005 | Yousefi'zadeh | 709/203 |
| 6,990,603 | B2 * | 1/2006 | Strasser | 714/6 |
| 7,047,315 | B1 * | 5/2006 | Srivastava | 709/238 |

(Continued)

FOREIGN PATENT DOCUMENTS

WO    WO 02/079973 A2 * 10/2002

OTHER PUBLICATIONS

Bea, "Weblogic Server 6.0", May 2001, pp. 1-22.*

*Primary Examiner*—Meng-Ai An
*Assistant Examiner*—Jennifer N To
(74) *Attorney, Agent, or Firm*—Fliesler Meyer LLP

(57) ABSTRACT

A system and method for server load balancing that includes server affinity. The system can be incorporated into application servers to support load balancing algorithms for RMI objects that provide server affinity. Server affinity uses smart load balancing for external client connections in such a way that it uses preexisting connection and reduces overhead: the client considers its existing connections to the application server instances when choosing the server instance on which to access a service. If a service is configured for server affinity, the client-side stub attempts to choose a server instance to which it is already connected, and continues to use the same server instance for method calls. All stubs on that client will attempt to use that server instance. If the server instance becomes unavailable, the stubs fail over, if possible, to a server instance to which the client is already connected.

18 Claims, 3 Drawing Sheets load algorithm: round-robin-affinity

U.S. PATENT DOCUMENTS

| | | | |
|---|---|---|---|
| 2002/0023173 A1* | 2/2002 | Jacobs et al. | 709/245 |
| 2002/0143953 A1* | 10/2002 | Aiken, Jr. | 709/227 |
| 2003/0195996 A1* | 10/2003 | Jacobs et al. | 709/313 |
| 2003/0204647 A1* | 10/2003 | Jacobs et al. | 709/330 |
| 2005/0203986 A1* | 9/2005 | Jacobs et al. | 709/200 |
| 2006/0031846 A1* | 2/2006 | Jacobs et al. | 719/313 |

* cited by examiner load algorithm: round-robin-affinity

SYSTEM AND METHOD FOR SERVER LOAD BALANCING AND SERVER AFFINITY

CLAIM OF PRIORITY

This application claims priority to U.S. Provisional Patent Application 60/449,775, filed Feb. 24, 2003, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and server clustering, and particularly to a system and method for server load balancing that supports server affinity.

BACKGROUND

In the field of application servers and distributed systems, clusters of servers are often used to provide highly available and scalable resources. One example of an application server is the WebLogic Server from BEA Systems, Inc. A cluster (such as a WebLogic Server cluster) comprises multiple server instances running simultaneously and working together to provide increased scalability and reliability. A cluster appears to clients to be a single server. The server instances that constitute a cluster can run on the same machine, or be located on different machines. A cluster's capacity can be increased by adding additional server instances to the cluster on an existing machine, or by adding machines to the cluster to host the incremental server instances. Each server instance in a cluster must typically run the same version of the server product.

In terms of how a cluster relates to the environment in which the application server exists, a cluster is usually part of a particular server (e.g. WebLogic Server) domain. A domain is an interrelated set of resources that are managed as a unit. A domain includes one or more server instances, which can be clustered, non-clustered, or a combination of clustered and non-clustered instances. A domain can include multiple clusters. A domain also contains the application components deployed in the domain, and the resources and services required by those application components and the server instances in the domain. Examples of the resources and services used by applications and server instances include machine definitions, optional network channels, Java 2 Enterprise Edition (J2EE) components, Enterprise Java Bean (EJB), connectors, and startup classes. An administrator can use a variety of criteria for organizing server instances into domains. For instance, they might choose to allocate resources to multiple domains based on logical divisions of the hosted application, geographical considerations, or the number or complexity of the resources under management.

In a WebLogic domain, one WebLogic Server instance typically acts as the Administration Server—the server instance which configures, manages, and monitors all other server instances and resources in the domain. Each Administration Server manages one domain only. If a domain contains multiple clusters, each cluster in the domain has the same Administration Server. All server instances in a cluster must reside in the same domain; i.e. you cannot "split" a cluster over multiple domains. Similarly, you cannot share a configured resource or subsystem between domains. For example, if you create a Java Database Connectivity (JDBC) connection pool in one domain, you cannot use it with a server instance or cluster in another domain. (Instead, you must create a similar connection pool in the second domain.).

Clustered server instances behave similarly to non-clustered instances, except that they provide failover and load balancing. The process and tools used to configure clustered server instances are the same as those used to configure non-clustered instances. A server cluster provides the following benefits and features:

Scalability—The capacity of an application deployed on a cluster can be increased dynamically to meet demand. Server instances can be added to a cluster without interruption of service—the application continues to run without impact to clients and end users.

High-Availability—In a cluster, application processing can continue when a server instance fails. Application components are "clustered" by deploying them on multiple server instances in the cluster-so, if a server instance on which a component is running fails, another server instance on which that component is deployed can continue application processing.

Failover—Failover means that when an application component (typically referred to as a "service" in the following sections) doing a particular "job"—some set of processing tasks-becomes unavailable for any reason, a copy of the failed service finishes the job. For the new service to be able to take over for the failed service there must be a copy of the failed service available to take over the job. There must also be information, available to other services and the program that manages failover, defining the location and operational status of all services-so that it can be determined that the first service failed before finishing its job. There must also be information, available to other services and the program that manages failover, about the progress of jobs in process—so that a service taking over an interrupted job knows how much of the job was completed before the first service failed, for example, what data has been changed, and what steps in the process were completed. Many application servers, including WebLogic Server, use standards-based communication techniques and facilities-multicast, IP sockets, and the Java Naming and Directory Interface (JNDI)—to share and maintain information about the availability of services in a cluster. These techniques allow the server to determine that a service stopped before finishing its job, and where there is a copy of the service to complete the job that was interrupted. Information about what has been done on a job is called state. WebLogic Server maintains information about state using techniques called session replication and replica-aware stubs. When a particular service unexpectedly stops doing its job, replication techniques enable a copy of the service to pick up where the failed service stopped, and finish the job.

Load Balancing—Load balancing is the even distribution of jobs and associated communications across the computing and networking resources in the application server environment. For load balancing to occur there must be multiple copies of a service that can do a particular job. Information about the location and operational status of all services must also be available. In addition, WebLogic Server allows services to be clustered—deployed on multiple server instances—so that there are alternative services to do the same job. WebLogic Server shares and maintains the availability and location of deployed services using multicast, IP sockets, and JNDI.

A clustered application or application component is one that is available on multiple server instances in a cluster. If a service is clustered, failover and load balancing for that service is available. Web applications can consist of different types of services, including Enterprise Java Beans (EJBs), servlets, and Java Server Pages (JSPs). Each service type has a unique set of behaviors related to control, invocation, and how it functions within an application. For this reason, the methods that WebLogic Server uses to support clustering—and hence to provide load balancing and failover—can vary for different types of services. The following types of services can be clustered in a WebLogic Server deployment: Servlets; JSPs; EJBs; Remote Method Invocation (RMI) objects; Java Messaging Service (JMS) destinations; and, Java Database Connectivity (JDBC) connections.

Different service types can have certain behaviors in common. When this is the case, the clustering support and implementation considerations for those similar service types may be same. In the sections that follow, explanations and instructions for the following types of services are generally combined: Servlets and JavaServer Pages (JSP); and EJBs and RMI objects. The sections that follow briefly describe the clustering, failover, and load balancing support that WebLogic Server provides for different types of services.

Servlets and JSPs

WebLogic Server provides clustering support for servlets and JSPs by replicating the Hypertext Transfer Protocol (HTTP) session state of clients that access clustered servlets and JSPs. WebLogic Server can maintain HTTP session states in memory, a filesystem, or a database.

EJBs and RMI Objects

Load balancing and failover for EJBs and RMI objects is handled using replica-aware stubs, which can locate instances of the service throughout the cluster. Replica-aware stubs are created for EJBs and RMI objects as a result of the service compilation process. EJBs and RMI objects are deployed homogeneously—to all the server instances in the cluster. Failover for EJBs and RMI objects is accomplished using the service's replica-aware stub. When a client makes a call through a replica-aware stub to a service that fails, the stub detects the failure and retries the call on another replica.

JDBC Connections

WebLogic Server allows you to cluster JDBC services, including data sources, connection pools and multipools, to improve the availability of cluster-hosted applications. Each JDBC service you configure for your cluster must exist on each managed server in the cluster.

JMS

The WebLogic Java Messaging Service (JMS) architecture implements clustering of multiple JMS servers by supporting cluster-wide, transparent access to destinations from any WebLogic Server server instance in the cluster. Although WebLogic Server supports distributing JMS destinations and connection factories throughout a cluster, the same JMS topic or queue is still managed separately by each WebLogic Server instance in the cluster.

However, even given the successes of clustering in the application server environment, a typical problem with today's clustered systems is that they do not suitably address the number of external client connections they handle. Method calls are typically load balanced among the available server instances according to the configured load balancing algorithm. As a result a large number of sockets must be opened and maintained between the external clients and server instances in the cluster. A new approach that disables traditional load balancing for external client connections, but still allows it for less costly server-to-server connections would be of great use in enhancing cluster stability and scalability.

SUMMARY OF THE INVENTION

Server affinity can be used to minimize the number sockets opened between external Java clients and server instances in a clustered environment. The invention accomplishes this by causing method calls on services to "stick" to an existing connection, instead of being load balanced among the available server instances. Embodiments of the present invention introduce three new load balancing algorithms for services and RMI objects that provide server affinity. Server affinity turns off load balancing for external client connections: instead, the client considers its existing connections to server instances when choosing the server instance on which to access a service. If a service is configured for server affinity, the client-side stub attempts to choose a server instance to which it is already connected, and continues to use the same server instance for method calls. All stubs on that client attempt to use that server instance. If the server instance becomes unavailable, the stubs fail over, if possible, to a server instance to which the client is already connected.

DETAILED DESCRIPTION

Figure 1:
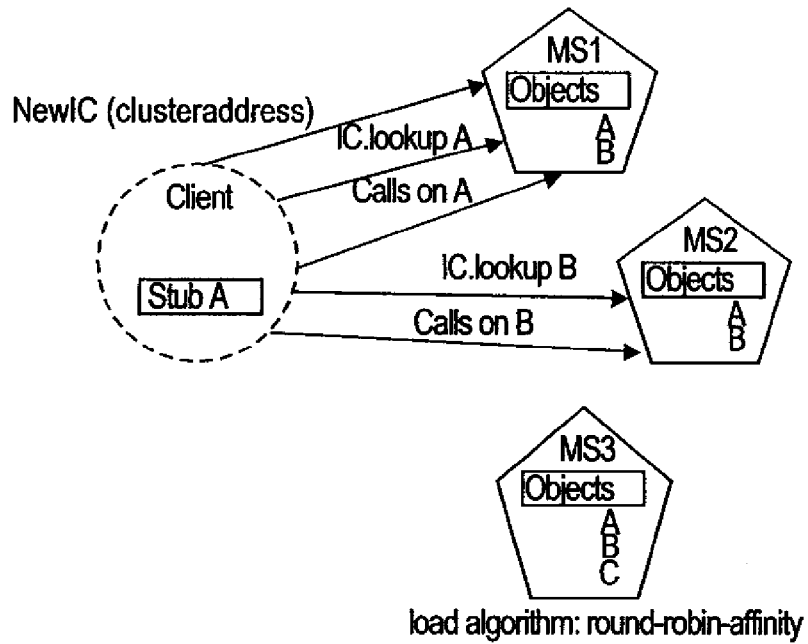
FIG. 1 shows a context from the cluster, in which the client obtains context from the cluster, in accordance with an embodiment of the invention.

The purpose of server affinity is to minimize the number sockets opened between external clients and server instances in a cluster. An embodiment of the invention accomplishes this by causing service requests to "stick" to an existing connection, instead of being load balanced among the available server instances.

Load Balancing for EJBs and RMI Objects

An embodiment of the invention introduces three new load balancing algorithms for services and RMI objects that provide server affinity. Server affinity turns off load balancing for external client connections: instead, the client considers its existing connections to server instances when choosing the server instance on which to access an service. If a service is configured for server affinity, the client-side stub attempts to choose a server instance to which it is already connected, and continues to use the same server instance for method calls. All stubs on that client attempt to use that server instance. If the server instance becomes unavailable, the stubs fail over, if possible, to a server instance to which the client is already connected.

Server affinity is used in combination with one of the standard load balancing methods: round-robin, weight-based, or random, providing a total of six alternatives for load balancing services:

Round-robin—round robin load balancing is used for both internal and external connections.

Weight-based—weight-based load balancing is used for both internal and external connections.

Random—random load balancing is used for both internal and external connections.

Round-robin-affinity—server affinity governs connections between external Java clients and server instances.

Weight-based-affinity—server affinity governs connections between external Java clients and server instances.

Random-affinity—server affinity governs connections between external Java clients and server instances.

By default, in one embodiment a WebLogic Server cluster uses round-robin load balancing for services. An administrator can configure a different default load balancing method for the cluster as a whole by using an Administration Console to set a weblogic.cluster.defaultLoadAlgorithm variable equal to the desired method. An administrator can also specify the load balancing algorithm for a specific RMI object using the—loadAlgorithm option in the RMIC compiler (rmic), in a deployment descriptor. A load balancing algorithm that you configure for a service overrides the default load balancing algorithm for the cluster. The load balancing algorithm for a service is maintained in the replica-aware stub obtained for a clustered service.

Server Affinity and Initial Context

A client can request an initial context from a particular server instance in the cluster, or from the cluster by specifying the cluster address in the URL. The connection process varies, depending on how the context is obtained:

If the initial context is requested from a specific Managed Server, the context is obtained using a new connection to the specified server instance.

If the initial context is requested from a the cluster, by default, context requests are typically load balanced on a round-robin basis among the clustered server instances.

To reuse an existing connection between a particular JVM and the cluster, set ENABLE_SERVER_AFFINITY to true in the hashtable of weblogic.jndi.WLContext properties you specify when obtaining context. (If a connection is not available, a new connection is created.) ENABLE_SERVER_AFFINITY is only supported when the context is requested from the cluster address.

Round Robin Load Balancing

An embodiment of the invention (as provided in WebLogic Server) uses the round-robin algorithm as the default load balancing strategy for clustered service stubs when no algorithm is specified. This algorithm is supported for RMI objects and EJBs. It is also the method used by WebLogic proxy plug-ins. The round-robin algorithm cycles through a list of server instances in order. For clustered services, the server list consists of server instances that host the clustered service. For proxy plug-ins, the list consists of all server instances that host the clustered servlet or JSP. The advantages of the round-robin algorithm are that it is simple, cheap and very predictable.

Weight-Based Load Balancing

This algorithm applies only to EJB and RMI object clustering. Weight-based load balancing improves on the round-robin algorithm by taking into account a pre-assigned weight for each server. Other application servers and implementations could use a different type of weight-based algorithm than that described herein. You can use the Server→Configuration→Cluster tab in the Administration Console to assign each server in the cluster a numerical weight between 1 and 100, in the Cluster Weight field. This value determines what proportion of the load the server will bear relative to other servers. If all the servers have the same weight, they will each bear an equal proportion of the load. If one server has weight 50 and all other servers have weight 100, the 50-weight server will bear half as much as any other server. This algorithm makes it possible to apply the advantages of the round-robin algorithm to clusters that are not homogeneous. If you use the weight-based algorithm, carefully determine the relative weights to assign to each server instance. Factors to consider include the processing capacity of the server's hardware in relationship to other servers (for example, the number and performance of CPUs dedicated to the server); and the number of non-clustered ("pinned") services each server hosts. If you change the specified weight of a server and reboot it, the new weighting information is propagated throughout the cluster.

Random Load Balancing

The random method of load balancing applies only to EJB and RMI object clustering. In random load balancing, requests are routed to servers at random. Random load balancing is recommended only for homogeneous cluster deployments, where each server instance runs on a similarly configured machine. A random allocation of requests does not allow for differences in processing power among the machines upon which server instances run. If a machine hosting servers in a cluster has significantly less processing power than other machines in the cluster, random load balancing will give the less powerful machine as many requests as it gives more powerful machines. Random load balancing distributes requests evenly across server instances in the cluster, increasingly so as the cumulative number of requests increases. Over a small number of requests the load may not be balanced exactly evenly.

Round-Robin Affinity, Weight-Based Affinity, and Random-Affinity

The invention introduces three new load balancing algorithms that provide server affinity: round-robin-affinity; weight-based-affinity; and random-affinity. Server affinity is supported for all types of RMI objects including JMS services, all EJB home interfaces, and stateless EJB remote interfaces. The server affinity algorithms consider existing connections between an external Java client and server instances in balancing the client load among server instances. Server affinity uses smart load balancing between external Java clients and server instances in such a way that it uses preexisting connection and reduces overhead. Server affinity causes method calls from an external Java client to stick to a server instance to which the client has an open connection, assuming that the connection supports the necessary protocol and Quality of Service (QOS). In the case of failure, server affinity causes the client to failover to a server instance to which it has an open connection, assuming that the connection supports the necessary protocol and QOS. Server affinity does not affect the load balancing performed for server-to-server connections.

Server Affinity Examples

The following examples illustrate the effect of server affinity under a variety of circumstances. In each example, the services deployed are configured for round-robin-affinity.

FIG. 1 shows the context from cluster. In this example, the client obtains context from the cluster. Lookups on the context and service calls stick to a single connection. Requests for new initial context are load balanced on a round-robin basis:

1. Client requests a new initial context from the cluster (Provider_URL=clusteraddress) and obtains the context from MS1.

2. Client does a lookup on the context for Service A. The lookup goes to MS1.

3. Client issues a call to Service A. The call goes to MS1, to which the client is already connected. Additional method calls to Service A stick to MS1.

4. If in a different virtual machine, client requests a new initial context from the cluster (Provider_URL=clusteraddress) and obtains the context from MS2.

5. Client does a lookup on the context for Service B. The call goes to MS2, to which the client is already connected. Additional method calls to Service B stick to MS2.

Figure 2:
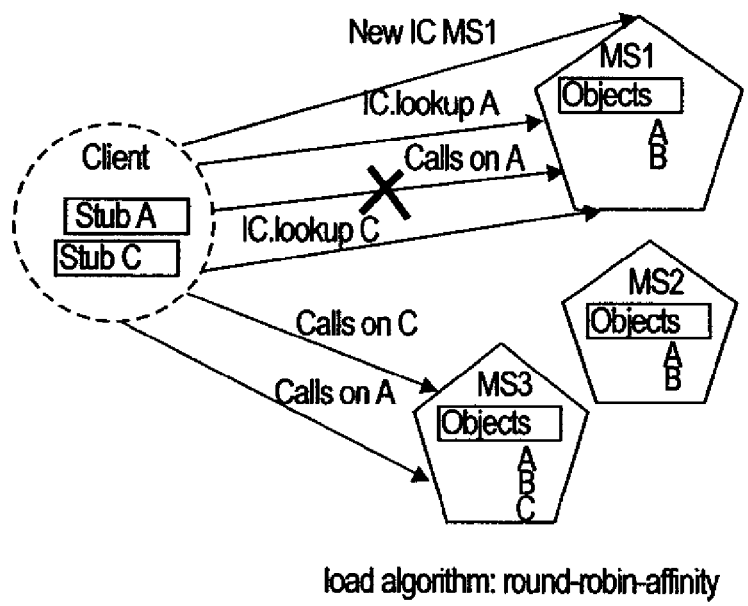
FIG. 2 shows server affinity and failover, illustrating the effect that server affinity has on service failover, in accordance with an embodiment of the invention.

FIG. 2 shows server affinity and failover. This example illustrates the effect that server affinity has on service failover. When a Managed Server goes down, the client fails over to another Managed Server to which it has a connection:

1. Client requests new initial context from MS1.

2. Client does a lookup on the context for Service A. The lookup goes to MS1.

3. Client makes a call to Service A. The call goes to MS1, to which the client is already connected. Additional calls to Service A stick to MS1.

4. The client obtains a stub for Service C, which is pinned to MS3. The client opens a connection to MS3.

5. MS1 fails.

6. Client makes a call to Service A. The client no longer has a connection to MS1. Because the client is connected to MS3, it fails over to a replica of Service A on MS3.

Figure 3:
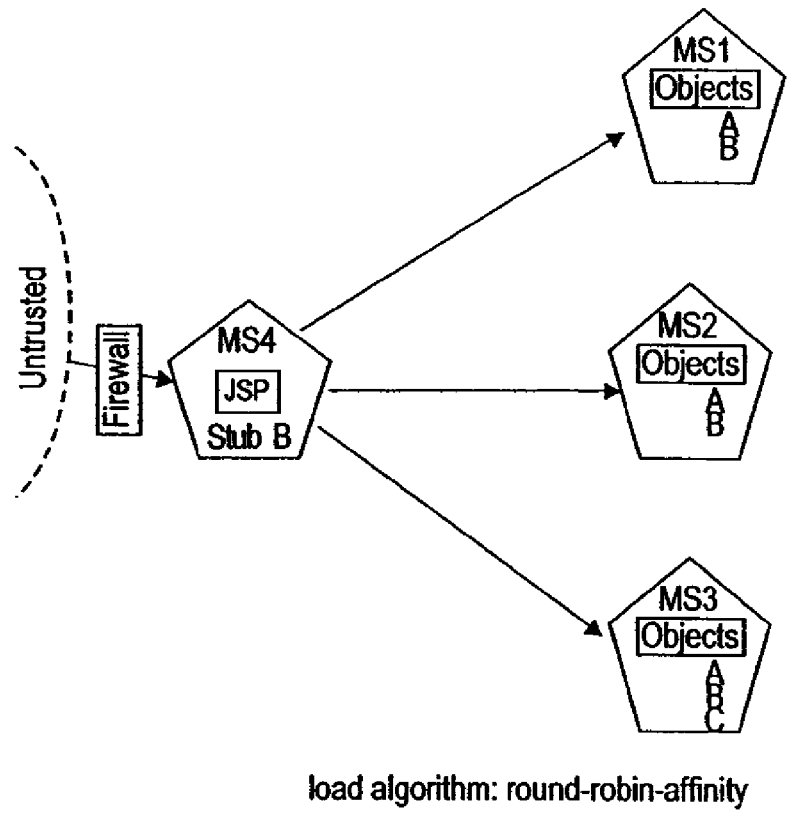
FIG. 3 shows server affinity and server-to-server connections, in accordance with an embodiment of the invention.

FIG. 3 shows server affinity and server-to-server connections. This example illustrates that server affinity does not affect the connections between server instances:

1. A JSP on MS4 obtains a stub for Service B. MS4 in this instance is acting as a client to MS1, MS2 and MS3.

2. The JSP selects a replica on MS1. For each method call, the JSP cycles through the Managed Servers upon which Service B is available, on a round-robin basis. The request always goes to MS1 unless MS1 fails or is unavailable for some reason.

Parameter-Based Routing for Clustered Services

Parameter-based routing allows you to control load balancing behavior at a lower level. Any clustered service can be assigned a CallRouter. This is a class that is called before each invocation with the parameters of the call. The CallRouter is free to examine the parameters and return the name server to which the call should be routed.

Optimization for Collocated Services

WebLogic Server does not always load balance an service's method calls. In most cases, it is more efficient to use a replica that is collocated with the stub itself, rather than using a replica that resides on a remote server. The following figure illustrates this.

Figure 4:
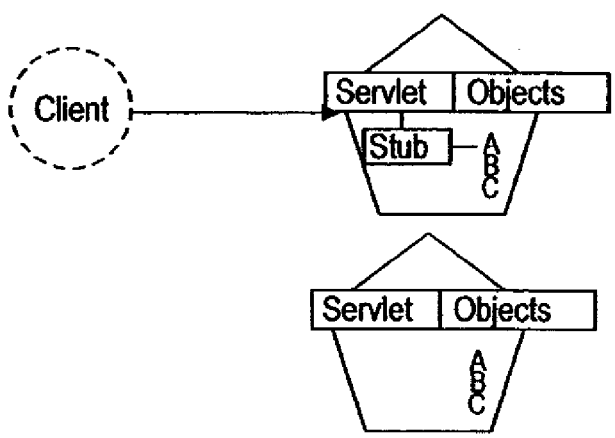
FIG. 4 shows a replica that is collocated with the stub itself, rather than using a replica that resides on a remote server, in accordance with an embodiment of the invention.

FIG. 4 shows how collocation optimization overrides load balancing logic for method call. In this example, a client connects to a servlet hosted by the first WebLogic Server instance in the cluster. In response to client activity, the servlet obtains a replica-aware stub for Service A. Because a replica of Service A is also available on the same server instance, the service is said to be collocated with the client's stub. WebLogic Server always uses the local, collocated copy of Service A, rather than distributing the client's calls to other replicas of Service A in the cluster. It is more efficient to use the local copy, because doing so avoids the network overhead of establishing peer connections to other servers in the cluster. If your Web application is deployed to a single cluster, the collocation optimization overrides any load balancing logic inherent in the replica-aware stub.

Transactional Collocation

Figure 5:
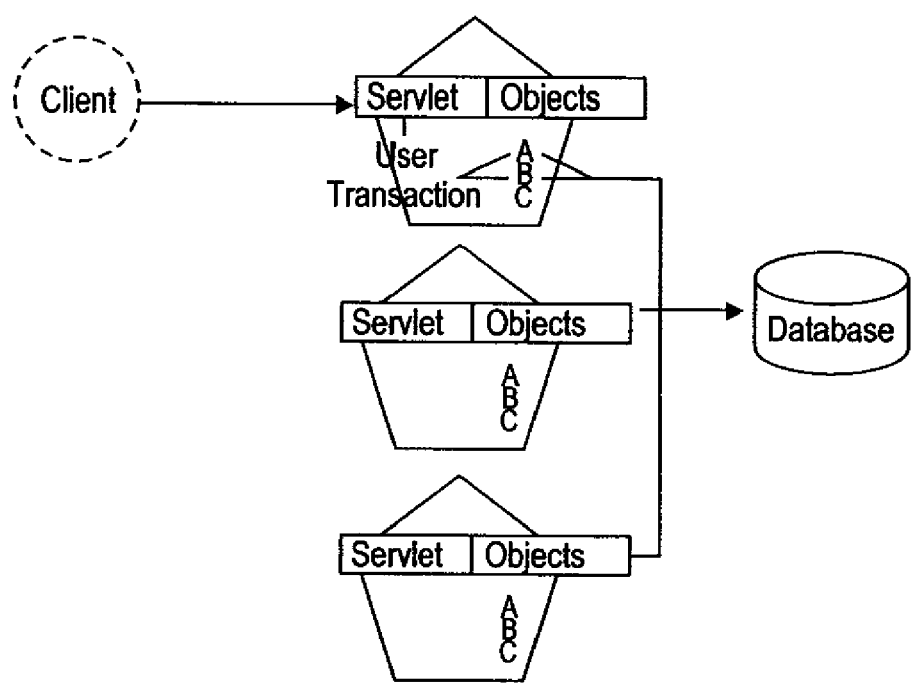
FIG. 5 shows attempts to use service replicas that are collocated with the transaction, in accordance with an embodiment of the invention.

As an extension to the basic collocation strategy, WebLogic Server attempts to use collocated clustered services that are enlisted as part of the same transaction. When a client creates a UserTransaction service, WebLogic Server attempts to use service replicas that are collocated with the transaction. This optimization is depicted in FIG. 5. In this example, a client attaches to the first WebLogic Server instance in the cluster and obtains a UserTransaction service. After beginning a new transaction, the client looks up Services A and B to do the work of the transaction. In this situation WebLogic Server always attempts to use replicas of A and B that reside on the same server as the UserTransaction service, regardless of the load balancing strategies in the stubs for A and B. This transactional collocation strategy is even more important than the basic optimization. If remote replicas of A and B were used, added network overhead would be incurred for the duration of the transaction, because the peer connections for A and B would be locked until the transaction committed. Furthermore, WebLogic Server would need to employ a multi-tiered JDBC connection to commit the transaction, incurring additional network overhead.

By using collocating clustered services during a transaction, WebLogic Server reduces the network load for accessing the individual services. The server also can make use of a single-tiered JDBC connection, rather than a multi-tiered connection, to do the work of the transaction.

Load Balancing for JMS

WebLogic Server JMS supports server affinity for distributed JMS destinations and client connections. By default, a WebLogic Server cluster uses the round-robin method to load balance services. To use a load balancing algorithm that provides server affinity for JMS services, you must configure the desired algorithm. You can configure the load balancing algorithm by using the Administration Console to set weblogic.cluster.defaultLoadAlgorithm.

Server Affinity for Distributed JMS Destinations

Server affinity is supported for JMS applications that use the distributed destination feature; this feature is not supported for pinned destinations. If you configure server affinity for JMS connection factories, a server instance that is load balancing consumers or producers across multiple physical destinations in a distributed destination set will attempt to load balance across any destinations that are running on the same a server instance.

Initial Context Affinity and Server Affinity for Client Connections

A system administrator can establish load balancing of JMS destinations across multiple servers in a cluster by configuring multiple JMS servers and using targets to assign them to the defined WebLogic Servers. Each JMS server is deployed on exactly one WebLogic Server and handles requests for a set of destinations. During the configuration phase, the system administrator enables load balancing by specifying targets for JMS servers. A system administrator can establish cluster-wide, transparent access to destinations from any server in the cluster by configuring multiple connection factories and using targets to assign them to WebLogic Servers. Each connection factory can be deployed on multiple WebLogic Servers. The application uses the Java Naming and Directory Interface (JNDI) to look up a connection factory and create a connection to establish communication with a JMS server. Each JMS server handles requests for a set of destinations. Requests for destinations not handled by a JMS server are forwarded to the appropriate server. WebLogic Server provides server affinity for client connections. If an application has a connection to a given server instance, JMS will attempt to establish new JMS connections to the same server instance. When creating a connection, JMS will try first to achieve initial context affinity. It will attempt to connect to the same server or servers to which a client connected for its initial context, assuming that the server instance is configured for that connection factory. For example, if the connection factory is configured for servers A and B, but the client has an InitialContext on server C, then the connection factory will not establish the new connection with A, but will choose between servers B and C. If a connection factory cannot achieve initial context affinity, it will try to provide affinity to a server to which the client is already connected. For instance, assume the client has an InitialContext on server A and some other type of connection to server B. If the client then uses a connection factory configured for servers B and C it will not achieve initial context affinity. The connection factory will instead attempt to achieve server affinity by trying to create a connection to server B, to which it already has a connection, rather than server C. If a connection factory cannot provide either initial context affinity or server affinity, then the connection factory is free to make a connection wherever possible. For instance, assume a client has an initial context on server A, no other connections and a connection factory configured for servers B and C. The connection factory is unable to provide any affinity and is free to attempt new connections to either server B or C.

Note: In the last case, if the client attempts to make a second connection using the same connection factory, it will go to the same server as it did on the first attempt. That is, if it chose server B for the first connection, when the second connection is made, the client will have a connection to server B and the server affinity rule will be enforced.

Load Balancing for JDBC Connections

Load balancing of JDBC connection requires the use of a multipool configured for load balancing. Load balancing support is an option you can choose when configuring a multipool. A load balancing multipool provides the high available behavior, and in addition, balances the load among the connection pools in the multipool. A multipool has an ordered list of connection pools it contains. If you do not configure the multipool for load balancing, it always attempts to obtain a connection from the first connection pool in the list. In a load-balancing multipool, the connection pools it contains are accessed using a round-robin scheme. In each successive client request for a multipool connection, the list is rotated so the first pool tapped cycles around the list.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers, servers, and computing environments, may use and benefit from the invention. It will also be evident that the invention may be used with services other than those described, including for example J2EE components, such as EJBs, and JSPs.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for server load balancing that includes server affinity, comprising:
 a plurality of machines executing a plurality of server instances;
 a cluster that includes the plurality of server instances providing services, and wherein each of the services provides a plurality of method calls;
 a load balancing and affinity processor that assigns servers from said cluster to service client requests in the form of service requests from clients; and
 a client-side stub which attempts to choose a server instance to which it is already connected, and continues to use the same server instance and the same connection for method calls of that service,
 wherein the system uses a load balancing algorithm that includes server affinity to govern connections between external Java clients and server instances and
 wherein the load balancing algorithm uses any of round-robin, weight-based, or random load balancing for connections between the server instances.

2. The system of claim 1 wherein all stubs on that client attempt to use that server instance.

3. The system of claim 1 wherein if the server instance becomes unavailable, the stubs fail over, if possible, to a server instance to which the client is already connected.

4. The system of claim 1 wherein the load balancing algorithm includes round robin load balancing used for both internal and external connections.

5. The system of claim 1 wherein the load balancing algorithm includes weight-based load balancing used for both internal and external connections.

6. The system of claim 1 wherein the load balancing method algorithm includes random load balancing used for both internal and external connections.

7. The system of claim 1 wherein round robin load balancing is used for connections between server instances.

8. The system of claim 1 wherein weight-based load balancing is used for connections between server instances.

9. The system of claim 1 wherein random load balancing is used for connections between server instances.

10. A method for server load balancing that includes server affinity, comprising the steps of:

providing a plurality of machines executing a plurality of server instances;

providing the plurality of server instances as a cluster providing services, and wherein each of the services provides a plurality of method calls;

assigning servers from said cluster to service client requests in the form of method calls from clients;

wherein said step of assigning includes using a client-side stub which attempts to choose a server instance to which it is already connected, and continues to use the same server instance and same connection for method calls for that service, wherein the method uses a load balancing algorithm that includes server affinity to govern connections between external Java clients and server instances, and wherein the load balancing algorithm uses any of round-robin, weight-based, or random load balancing for connections between the server instances.

11. The method of claim 10 wherein all stubs on that client attempt to use that server instance.

12. The method of claim 10 wherein if the server instance becomes unavailable, the stubs fail over, if possible, to a server instance to which the client is already connected.

13. The method of claim 10 wherein the load balancing algorithm includes round robin load balancing used for both internal and external connections.

14. The method of claim 10 wherein the load balancing algorithm includes weight-based load balancing used for both internal and external connections.

15. The method of claim 10 wherein the load balancing algorithm includes random load balancing used for both internal and external connections.

16. The method of claim 10 wherein round robin load balancing is used for connections between server instances.

17. The method of claim 10 wherein weight-based load balancing is used for connections between server instances.

18. The method of claim 10 wherein random load balancing is used for connections between server instances.

\* \* \* \* \*

UNITED STATES PATENT AND TRADEMARK OFFICE
CERTIFICATE OF CORRECTION

| | |
|---|---|
| PATENT NO. | : 7,406,692 B2 |
| APPLICATION NO. | : 10/785778 |
| DATED | : July 29, 2008 |
| INVENTOR(S) | : Halpern et al. |

It is certified that error appears in the above-identified patent and that said Letters Patent is hereby corrected as shown below:

In column 3, line 57, before "instance" delete "server".

In column 4, line 63, delete "an" and insert -- the --, therefor.

In column 5, line 28, delete "-loadAlgorithm" and insert -- -LoadAlgorithm --, therefor.

In column 5, line 44, after "from" delete "a".

In column 7, line 66, delete "an" and insert -- on --, therefor.

In column 9, lines 44-45, delete "initial context" and insert -- InitialContext --, therefor.

In column 10, line 59, in Claim 1, delete "instances" and insert -- instances, --, therefor.

In column 11, line 8, in Claim 6, after "balancing" delete "method".

Signed and Sealed this

Ninth Day of February, 2010

David J. Kappos
*Director of the United States Patent and Trademark Office*